Aug. 20, 1935.  C. A. PAGE  2,011,648
LAMINATED MATERIAL AND METHOD OF PRODUCING SAME
Filed Aug. 23, 1930  2 Sheets-Sheet 1
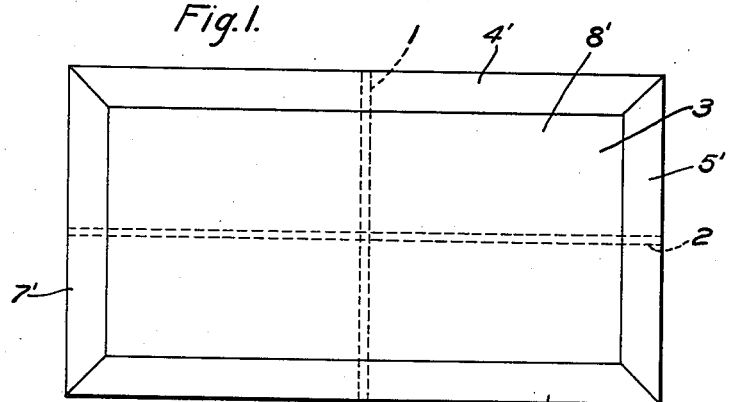
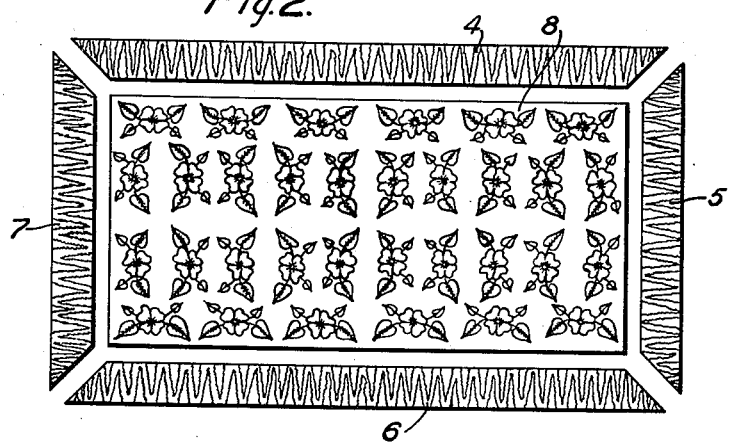
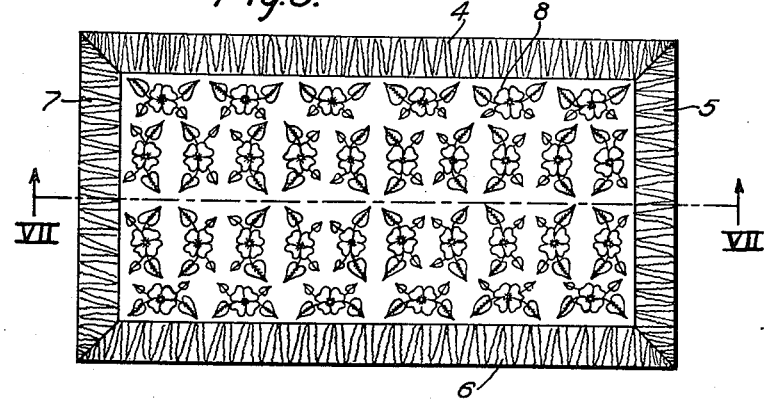
INVENTOR
Charles A. Page.
BY
ATTORNEY Aug. 20, 1935.  C. A. PAGE  2,011,648
LAMINATED MATERIAL AND METHOD OF PRODUCING SAME
Filed Aug. 23, 1930  2 Sheets-Sheet 2
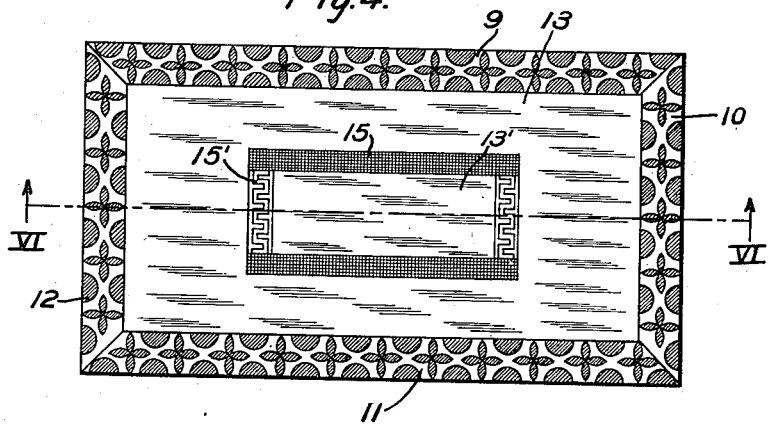
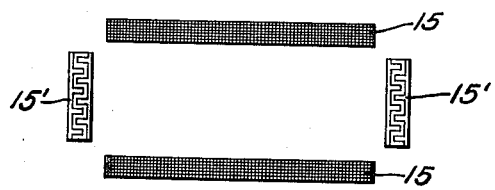
INVENTOR
Charles A. Page.
BY
ATTORNEY

Patented Aug. 20, 1935

2,011,648

UNITED STATES PATENT OFFICE 2,011,648

LAMINATED MATERIAL AND METHOD OF PRODUCING SAME

Charles A. Page, Wilkinsburg, Pa., assignor to Westinghouse Electric & Manufacturing Company, a corporation of Pennsylvania Application August 23, 1930, Serial No. 477,371

5 Claims. (Cl. 41—35)

My invention relates to laminated materials and to processes of producing the same and more particularly to laminated articles having one or more decorated surfaces.

The principal object of my invention is to provide a laminated material having a surface which has an inlay-effect appearance.

Another object of my invention is to provide a method for the duplication of any desired pattern or motif on the surface of molded laminated material.

A further object of my invention is to provide a laminated material having a surface sheet bearing a decorative design formed of separate elements which are integrally united together during the molding operation.

At the present time, it is the practice, in the wood-working art, to produce articles having decorative inlays by either planing or sanding the wooden material to provide a recess and then affixing the decorative inlay in the recess by means of a suitable adhesive, the inlay being held in position by mechanical pressure until the adhesive has hardened. The surface of the inlaid material is then sanded and finished in the desired manner. Such a method of producing decorative effects, however, is not applicable to molded laminated material because the sanding or planing destroys the finish which is formed during the pressing operation.

I have made the discovery that molded laminated material bearing decorative designs which resembles the effects obtained by forming inlays in wood may be produced by a process which comprises assembling a plurality of pieces of decorative material, impregnated with a binder capable of being hardened under heat and pressure, edge to edge upon a sheet of fibrous material impregnated with the same or a similar binder, placing the fibrous sheet, with the superimposed pieces, upon one or both surfaces of a plurality of sheets of fibrous material that have also been impregnated with the binder, and molding the assembled layers to form a composite article having integral surface sheets.

My invention will be better understood by reference to the accompanying drawings in which:

Figure 1 is a plan view of a sheet of fibrous material having guide lines inscribed thereon, Fig. 2 is a similar view showing pieces of decorative material adapted to be placed on the sheet shown in Fig. 1, Fig. 3 is a plan view of my improved laminated material, showing the decorative pieces molded in place, Fig. 4 is a view, similar to Fig. 3, showing the decorative pieces arranged in a different manner, Fig. 5 is a plan view of pieces of decorative inlay material before they have been assembled in place, as shown in Fig. 4, Fig. 6 is a cross-sectional view of the laminated material on line VI—VI of Fig. 4 and Fig. 7 is a cross-sectional view of the laminated material on line VII—VII of Fig. 3.

Referring to the drawings, the numerals 1 and 2 designate guide lines which are inscribed on a sheet of fibrous material 3 which has been impregnated with a binder capable of being hardened under heat and pressure, such as a phenolic condensation product, a urea condensation product, a thiourea condensation product, or a mixture of a urea and a thiourea condensation product. Decorative paper, cloth or a thin sheet of wood or veneer is next impregnated with the same or a similar binding agent, and pieces of predetermined dimensions are cut or stamped therefrom, as indicated by the numerals 4, 5, 6, 7 and 8. These pieces, which should preferably all be of the same thickness, are then assembled edge to edge in the positions designated by the numerals 4', 5', 6', 7' and 8' on the fibrous base sheet 3 and are held in position by a suitable adhesive, such as a solution of phenolic condensation product or a urea or a thiourea condensation product or a mixture of two or more of such binders, which is placed upon the guide lines 1 and 2 and permitted to dry until it has attained the tacky stage.

The pieces may be of such shape and arranged in such manner that any desired pattern or motif may be produced. For example, in the illustration shown in Figs. 1, 2 and 3, the pieces 4, 5, 6 and 7 indicate a border having the appearance of wood in the interior of which a larger piece resembling tapestry is placed or inserted.

The fibrous sheet 3, together with the superimposed pieces 4, 5, 6, 7 and 8, which are held in place by the adhesive previously mentioned, are then placed upon one or both surfaces of one or a plurality of sheets of fibrous material which have also been impregnated with a binder capable of being hardened, under heat and pressure, such as one of those previously mentioned, and the assembled sheets are molded, under heat and pressure, to form a composite article, as shown in Fig. 7. In practice, I have found it expedient to impregnate the decorative pieces with a binder having a greater concentration of resin than the body sheets. During the molding process, the decorative pieces are united integrally to each other and to the body sheets.

A surface layer is thus formed, as shown in Fig. 3 of the drawings, with a border resembling wood, and a decorative center resembling tapestry, which appears as if it were formed interiorly of the border by an inlaying process.

Figs. 4, 5 and 6 of the drawings show a modified form of my invention. In this modification, the border pieces 9, 10, 11 and 12 are formed of tapestry, and the pieces 13 and 13' are formed of wood or other fibrous material having a print thereon resembling wood, the decorative pieces being impregnated with a binder capable of being hardened, under heat and pressure, as in the previous example. It will be noted, by referring to Fig. 4 of the drawings, that the piece 13 is in special relationship to the piece 13'. The pieces 13 and 13' may be formed separately or by stamping or cutting out strips from a larger piece. Strips of wood or other fibrous material 15 and 15' of a different color from pieces 13 and 13' or having a different design printed thereon may then be impregnated with one of the binders and placed on the spaces stamped or cut out from between the pieces 13 and 13'. In such instances, however, no adhesive will be required to hold the strips 15 in place. The sheet of fibrous material, with the superimposed pieces in place, may then be interposed upon a plurality of sheets which have been impregnated with a binder capable of being hardened under heat and pressure, such as those previously specified, and the assembly molded under heat and pressure to form a composite integral article, such as is shown in Fig. 6, the outer sheets 16 being formed of the assembled decorative pieces, and the body 17 being formed of laminated sheet material.

Any color of decorative paper, cloth or thin wood may be utilized but, in order to produce a uniform article, all pieces of the decorative material employed in the same plane should be of approximately the same thickness.

By employing the method which I have described, laminated material having beautiful inlay-appearing effects may be obtained which is characterized by having no open seams or joints. The finish closely resembles that of wood but it is more economical to fabricate because no additional finishing treatment is required.

The possible number of designs or motifs which may be produced by my method is unlimited in number and scope. Any combination of fibrous material, such as colored or decorated cloth, paper or thin wood may be utilized in producing panels which are suitable for furniture fabrication or for interior decorating purposes.

While I have described my invention in considerable detail and have given specific examples, it will be understood that the examples should be construed as illustrative and not by way of limitation.

For example, instead of affixing the decorative pieces to a surface sheet and then placing the surface sheet upon a plurality of sheets that have been impregnated with a binder, the decorative pieces may be impregnated with the binder and fastened directly upon the top sheet of a plurality of layers of fibrous material that have already been assembled. It will also be understood that, instead of cutting or stamping out strips and inserting strips of a different color, as shown in Fig. 4, the cuttings or stampings may be of any desired configuration or may be formed in such manner and of such color or design that they will represent fruit, flowers, or various other objects.

Other modifications of my invention will be apparent to those skilled in the art without departing from the spirit and scope of my invention. It is, therefore, desired that only such limitations shall be imposed therein as are indicated in the appended claims.

I claim as my invention:

1. The process of forming a laminated article, which comprises removing a portion of a decorative piece which has been impregnated with a binder capable of being hardened under heat and pressure, assembling the decorative piece upon one or a plurality of sheets of fibrous material which has been impregnated with a similar binder and carrying an excess of the impregnating material, inserting a decorative piece of a different color or design in the space from which the portion has been removed and molding the assembled layers under heat and pressure to form a smooth inlay surface consolidated with the body of the article.

2. An article having a decorative surface of inlay appearance, comprising a laminated body of fibrous sheets impregnated with heat-hardened resinous condensation product and a surface layer formed of a plurality of decorative pieces of fibrous material arranged closely beside each other and impregnated with an excess of heat-hardened resinous condensation product so as to unite the decorative surface to the body and to fill the joints and inlay the individual decorative pieces with the heat-hardened condensation product.

3. An article having a decorative surface of inlay appearance, comprising a laminated body of fibrous sheets impregnated with heat-hardened resinous condensation product and united thereby to a surface layer formed of a plurality of decorative pieces of fibrous material arranged closely beside each other and impregnated with heat-hardened resinous condensation product, the individual decorative pieces carrying an excess of the resinous product sufficient to fill the joints between them forming with the heat-hardened resinous condensation product in the body an integral, smooth inlay surface.

4. The process of producing a laminated article having a decorative inlay surface, which comprises arranging a plurality of pieces of decorative material to adjoin each other in close juxtaposition, said pieces being impregnated with a resinous condensation product and carrying an excess of said resinous product capable of being hardened under heat and pressure, assembling therewith a laminated body of fibrous sheets impregnated likewise and molding the assembly under heat and pressure to consolidate the mass and to fill the joints between the individual decorative pieces so as to obtain a smooth inlay surface.

5. A process of producing a laminated article having a decorative inlay surface, which comprises arranging a laminated body of sheets containing heat-hardening resinous condensation product, assembling thereon a decorative surface containing fibrous individual pieces arranged closely beside each other, the individual pieces being impregnated with heat-hardening resinous condensation product in greater concentration than the laminated body portion, and molding the assembly under heat and pressure to consolidate the mass and to fill the joints between the individual decorative pieces so as to obtain a smooth inlay surface.

CHARLES A. PAGE.